March 24, 1942.  R. C. PIERCE  2,277,145
REINFORCING CABLE
Filed April 19, 1941
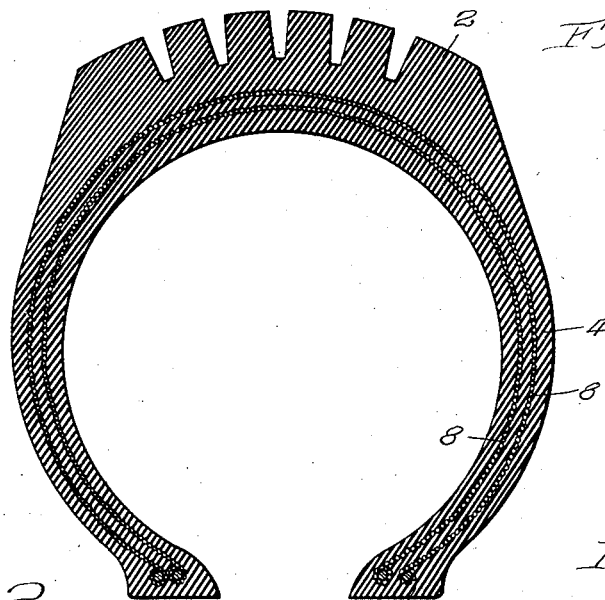
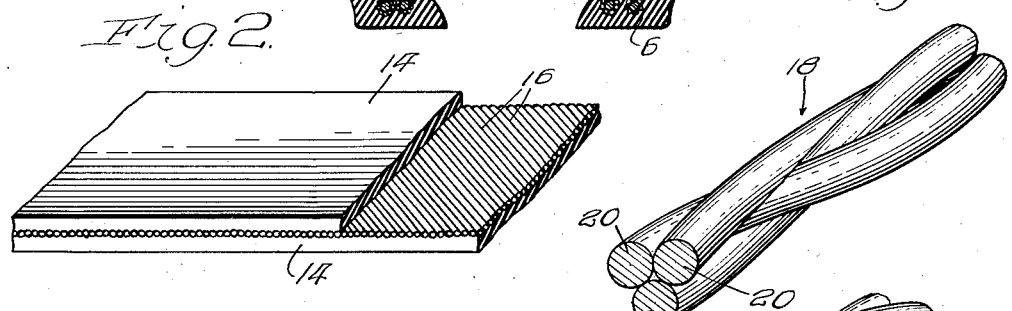
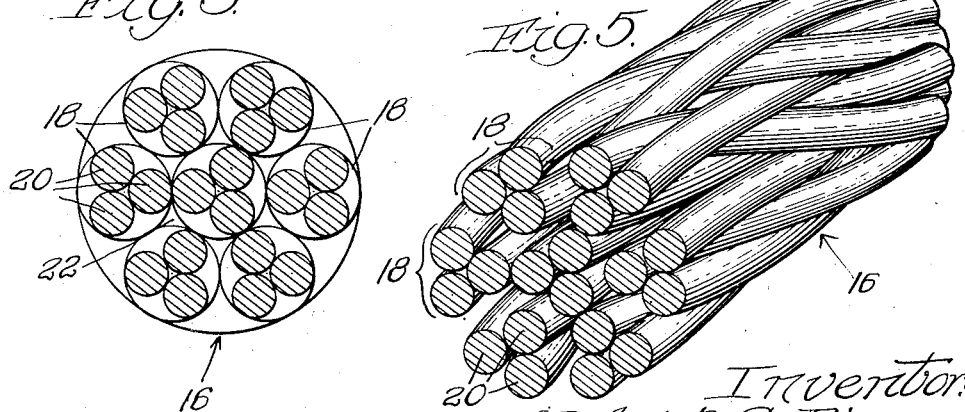
Inventor:
Robert C. Pierce Patented Mar. 24, 1942

2,277,145

UNITED STATES PATENT OFFICE 2,277,145

REINFORCING CABLE

Robert C. Pierce, Niles, Mich., assignor to National-Standard Company, a corporation of Michigan Application April 19, 1941, Serial No. 389,460

7 Claims. (Cl. 57—145)

This invention relates to improvements in reinforcing cable and more especially to a flexible metallic cable particularly adapted for use in reinforcing rubber and similar material. Merely for the purpose of illustrating one use of the cable as an example, I have here shown it particularly adapted for use in the carcass of a pneumatic tire casing such as is commonly used for motor vehicles.

My improved cable is adapted for use as a stress resisting element in the tire casing.

The principal feature of my invention is to make a cable having great tensile strength and flexibility and having large interstices to permit great contact between the rubber and the surface area of each of the filaments of the cable.

I use elongated members made of filaments braided together. When the filaments are braided together, the interstices between the same are quite large and there is a correspondingly great penetration of rubber between the filaments. This results in large contact between the rubber and the surface area of each of the filaments. In my improved construction the filaments, for example three wires, are braided together to form an elongated member. This prevents line contact between the filaments and substitutes therefor a series of point contacts, thus entirely preventing the formation of a closed cavity at the center of the elongated member and permitting penetration of the rubber entirely through the same to give contact of the rubber with substantially the entire surface area of each filament.

The cable may be formed by twisting the elongated members together. For example, seven elongated members may be twisted together to form a cable. Here the twisting does not form any closed cavities because whether the filaments are twisted or braided together to form the elongated member, the outer surface of the elongated member will not be smooth and this will prevent line contacts between adjacent elongated members.

In that form of device embodying the features of my invention illustrated in the accompanying drawing, Fig. 1 is a vertical sectional view of a pneumatic tire casing; Fig. 2 is a view in perspective of a ply embodying the invention, with portions broken away; Fig. 3 is a vertical sectional view of the cable; Fig. 4 is a view in perspective of an elongated member; and Fig. 5 is a view in perspective of the cable.

As shown in the drawing, Fig. 1 shows a section of a tire casing with the tread 2, side walls 4 and beads 6. Imbedded in the side walls 4 of the tire and extending over the tread portion 2 are shown two layers 8 of metallic cables. It will be understood that more or fewer than two layers may be employed.

The metallic cable layers 8 are ordinarily originally made in the form of a rubber containing fabric such as shown in Fig. 2, the rubber 14 being rubber "Laytex" or rubber in an unvulcanized state. The plies may be made by arranging a plurality of spaced, substantially parallel cables 16 under substantially uniform tension on a suitable form. Each cable, as shown in Figs. 3 and 5, may consist of elongated members 18 (see Fig. 4), each elongated member being made up of wires or filaments 20 braided together. Merely by way of example, I have shown an elongated member 18 composed of three wires 20, 20 braided together and I have shown a cable 16 composed of seven elongated members twisted together. It is to be understood, however, that the elongated member may be composed of more than three wires braided together and the cable may comprise more than seven or fewer than seven elongated members twisted together. It is understood also that the individual filaments or wires 20 may be narrowed in diameter in accordance with the number of filaments and elongated members used to produce cables of substantially the same diameter regardless of the number of elongated members 18 and filaments 20, or different numbers of filaments of larger or smaller sizes may be used to produce larger or smaller cables. It will be seen that practically the entire surface area of the filaments 20 is exposed to the rubber 14 enclosing them in the completed ply. In addition, there are large interstices 22 between the elongated members 18 into which the rubber can penetrate during the ply forming operation and during subsequent vulcanization.

The penetration into and contact of the rubber with the surfaces of the filaments, elongated members, and cables is not relied upon solely to bond the cables to the tire carcass; but a bonding substance, well known in the art, may be employed to increase the adhesion between the metal surfaces and the rubber.

The fabric shown in Fig. 2 may be formed by suitably treating the cables, placing the same between layers of rubber 14 and then squeezing the fabric to force the rubber into the interstices of the cables and elongated members to produce a well supporting fabric.

Completed plies of fabric may be built into a tire in the usual manner, the plies of fabric ordinarily being cut on the bias as shown in Fig. 2 so that the cables will extend diagonally across the plies and when used in a tire carcass will extend diagonally across or around the carcass.

The final vulcanizing step causes the rubber of the fabric, the rubber plies and the tread to flow together, substantially to completely surround all of the filaments of the cable, penetrating entirely through the cables and vulcanizing the rubber firmly thereto, thus producing a casing of substantially homogeneous rubber containing strongly adhering, individually movable, flexible cables of great tensile strength, the elongated members and filaments of which are cushioned and substantially separated by thin filaments of rubber.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. An elongated member consisting of a plurality of bent metallic filaments lying close together and having substantially only point contacts with each other and rubber covering, impregnating, and penetrating entirely through said member, said rubber in contact with substantially the entire surface of each metallic filament except where said filaments have point contact with each other.

2. A plurality of elongated members twisted together, each elongated member consisting of a plurality of bent metallic filaments lying close together and having substantially only point contacts with each other and rubber covering said members and impregnating the same, said rubber in contact with substantially the entire surface of each metallic filament except where said filaments have point contact with each other.

3. A plurality of elongated members twisted together, each elongated member consisting of three bent metallic filaments lying close together and having substantially only point contacts with each other and rubber covering said members and impregnating the same, said rubber in contact with substantially the entire surface of each metallic filament except where said filaments have point contact with each other.

4. An elongated member consisting of a plurality of metallic filaments braided together and rubber covering said member and impregnating the same, said rubber in contact with substantially the entire surface of each metallic filament except where said filaments have contact with each other.

5. A plurality of elongated members twisted together, each elongated member consisting of a plurality of metallic filaments braided together and rubber covering said member and impregnating the same, said rubber in contact with substantially the entire surface of each metallic filament except where said filaments have contact with each other.

6. A plurality of elongated members twisted together, each elongated member consisting of three metallic filaments braided together and rubber covering said members and impregnating the same, said rubber in contact with substantially the entire surface of each metallic filament except where said filaments have contact with each other.

7. Seven elongated members twisted together, each elongated member consisting of a plurality of metallic filaments braided together and rubber covering said members and impregnating the same, said rubber in contact with substantially the entire surface of each metallic filament except where said filaments have contact with each other.

ROBERT C. PIERCE.